United States Patent [19]
Kovacs

[11] Patent Number: 5,807,652
[45] Date of Patent: Sep. 15, 1998

[54] PROCESS FOR PRODUCING PROCESS COLOR IN A SINGLE PASS WITH THREE WAVELENGTH IMAGER AND THREE LAYER PHOTORECEPTOR

[75] Inventor: Gregory J. Kovacs, Mississauga, Canada

[73] Assignee: Xerox Corporation, Stamford, Conn.

[21] Appl. No.: 915,430

[22] Filed: Aug. 20, 1997

[51] Int. Cl.[6] ................................................. G03G 13/01
[52] U.S. Cl. ................................................ 430/42; 430/44
[58] Field of Search ........................................ 430/42, 44

[56] References Cited

U.S. PATENT DOCUMENTS

| | | | |
|---|---|---|---|
| 4,731,634 | 3/1988 | Stark | 399/232 |
| 4,868,611 | 9/1989 | Germain | 399/232 |
| 5,049,949 | 9/1991 | Parker et al. | 399/232 |
| 5,155,541 | 10/1992 | Loce et al. | 399/232 |
| 5,221,954 | 6/1993 | Harris | 399/232 |
| 5,223,906 | 6/1993 | Harris | 399/232 |
| 5,337,136 | 8/1994 | Knapp et al. | 399/299 |
| 5,347,303 | 9/1994 | Kovacs et al. | 347/118 |
| 5,373,313 | 12/1994 | Kovacs | 347/118 |
| 5,444,463 | 8/1995 | Kovacs et al. | 347/118 |
| 5,534,990 | 7/1996 | Harris | 399/232 |
| 5,565,974 | 10/1996 | Harris | 399/226 |
| 5,592,281 | 1/1997 | Parker et al. | 399/156 |

*Primary Examiner*—Roland Martin

[57] ABSTRACT

A process for producing eight distinct colors, (viz. K, C, M, Y, CM, CY, MY and W) in a single pass with a single exposure in a $3\lambda/3L$ imaging system is provided. The use of xerocolography with a fifth developer housing containing the same color toner as one of the four normally used developer housings and suitable flood exposure devices overcomes the limitations of prior art K+6 imaging systems which utilize an exposure device capable of emitting light beams at three different wavelengths and a photoreceptor having three layers responsive to the three wavelengths.

20 Claims, 4 Drawing Sheets

PROCESS FOR PRODUCING PROCESS COLOR IN A SINGLE PASS WITH THREE WAVELENGTH IMAGER AND THREE LAYER PHOTORECEPTOR

BACKGROUND OF THE INVENTION

This invention relates to a full color, xerographic printing system using a Raster Output Scanner (ROS) incorporating a three wavelength (λ) laser diode source for the ROS and a charge retentive surface in the form of a belt or drum structure which is responsive to the three wavelengths and, more particularly, to a full process color, K+6 (black+6 colors: cyan, magenta, yellow, red, green, blue), single pass, single exposure imaging system. Single pass means that the imaging surface passes through the processing areas of the printing apparatus only once to produce the full color image.

Xerocolography (dry color printing) is a color printing architecture which combines multi-color xerographic development with multiwavelength laser diode light sources, with a single polygon, single optics ROS and with apolychromatic, multilayered photoreceptor to provide color printing in either a single pass or in two passes. Inherently perfect registration is achieved since the various color images are all written at the same imaging station with the same ROS.

Xerocolography is capable of producing either highlight color or process color images in a single pass as well as in multiple passes. In creating full process color images, using Image On Image (IOI) technology, toner particles are deposited on already developed toner images. With this type of imaging, it is desirable to use Non-Interactive Development (NID) in order to avoid scavenging of an already developed image.

Several different schemes have been developed for achieving process color with a multiwavelength imager and multilayered photoreceptor wherein each layer is accessible to only one of the wavelengths. To make the architecture as compact as possible it is desirable to use only one imager and still be able to create K+6 colors.

For one dual wavelength imager and a dual layer photoreceptor, process color can be achieved in two passes. With four developer housings a direct black is used and the achievable color gamut consists of K (black), C (cyan), M (magenta), Y (yellow), CM(=B) (blue), CY(=G) (green), MY(=R) (red) and W (white).

To achieve process color in a single pass with one imager, a four wavelength imager/four layer photoreceptor (4λ,4L) system has been developed. However, since a three wavelength imager/three layer photoreceptor (3λ/3L) system is easier and less costly to fabricate than the (4λ/4L) devices, there is a need for an architecture for producing process color in a single pass and with a single exposure using a 3λ/3L system. A process has been developed previously for producing K+3 colors in a single pass with one imagewise exposure using a 3λ/3L system. However, process color systems using a single exposure in a single pass consisting of K+6 colors have remained a challenge.

A 3λ/3L system has a total of eight discharge states. Full gamut process color requires K+6 colors+W and therefore in principle the eight discharge states of a 3λ/3L system are sufficient to achieve process color. However, if one is restricted to the use of four developer housings the eight distinct discharge states cannot be maintained distinct while driving the development process. The necessary flood exposure steps driving the development process will cause initially distinct discharge states to become degenerate resulting in exactly identical internal charges, fields and voltages. Once this happens the degeneracy between these two states cannot be lifted. The two states will thenceforth develop identically through the rest of the process steps and produce the same color at the end of the process. Some of the starting eight distinct discharge states therefore become degenerate and develop out to the same color so that the ability to produce the desired eight distinct colors (K, C, M, Y, CM, CY, MY and W) is lost.

As may be appreciated, it is desirable to be able to create process color images in a single pass using a minimum number of exposures and a photoreceptor that is as low in cost and complexity as possible.

In accordance with the intents and purposes of the present invention there is disclosed a 3λ/3L color imaging system capable of producing K+6 colors+W in a single pass using a single exposure from a 3 wavelength imaging device and a 3 layer photoreceptor.

Following is a discussion of prior art, incorporated herein by reference. In addition to possibly having some relevance to the question of patentability, these references, together with the detailed description to follow, are intended to provide a better understanding and appreciation of the present invention.

U.S. Pat. No. 4,731,634 entitled "Apparatus For Printing Black And Plural Highlight Color Images In A Single Pass" granted to Howard M. Stark on Mar. 15, 1988 discloses a method and apparatus for rendering latent electrostatic images visible using multiple colors of dry toner or developer and more particularly to printing toner images in black and at least two highlighting colors in a single pass of the imaging surface through the processing areas of the printing apparatus. Two of the toners are attracted to only one charge level on a charge retentive surface to thereby providing black and one highlight color while two toners are attracted to another charge level to form the second highlight color.

U.S. Pat. No. 4,868,611 entitled "Tri-Level Xerography Scorotron Neutralization Concept" granted to Richard P. Germain on Sep. 19, 1989 discloses the use of a scorotron after the development of a first image. The scorotron serves to bring that first image to complete charge neutralization which removes the voltage responsible for the fringe fields thereby precluding fringe field development during the development of a subsequent image.

U.S. Pat. No. 5,049,949 entitled "Extension Of Tri-Level Xerography To Black Plus 2 Colors" granted to Parker et al on Sep. 17, 1991 discloses a highlight color printing apparatus and method for forming one black and two color images. A tri-level image containing CAD (charged area development) and DAD (discharged area development) image areas and a background area is formed. A second DAD image is formed by discharging the background area forming part of the tri-level image.

U.S. Pat. No. 5,155,541 entitled "Single Pass Digital Printer With Black, White And 2-Color Capability" granted to Robert P. Loce et al on Oct. 13, 1992 discloses a method and apparatus for printing toner images in black and at least two highlighting colors in a single pass of the imaging surface through the processing areas of the printing apparatus. Imaging and development techniques of color photography and tri-level xerography are combined to produce images with black and two colors wherein the two highlighting colors are developed with only one color toner. A single imaging step forms a four level charge pattern on a charge retentive surface followed by development of two of the image levels using tri-level imaging techniques. Uniform exposure of the imaging surface, similar to that used in color photography techniques precedes development of the last image. The uniform exposure modifies the last developed image level and the background charge level allowing development of the last image with a single toner.

U.S. Pat. No. 5,221,954 entitled "Single Pass Full Color Printing System Using A Quad-Level Xerographic Unit" granted to Ellis D. Harris on Jun. 22, 1993 discloses a four color toner single pass color printing system consisting generally of a raster output scanner (ROS) optical system and a quad-level xerographic unit and a tri-level xerographic unit in tandem. The resulting color printing system would be able to produce pixels of black and white and all six primary colors. The color printing system uses a black toner and toners of the three subtractive primary colors or just toners of the three subtractive primary colors.

U.S. Pat. No. 5,223,906 entitled "Four Color Toner Single Pass Color Printing System Using Two Tri-Level Xerographic Units" granted to Ellis D. Harris on Jun. 29, 1993 discloses a four color toner single pass color printing system consisting generally of a raster output scanner (ROS) optical system and two tri-level xerographic units in tandem. Only two of the three subtractive primary colors of cyan, magenta and yellow are available for toner dot upon toner dot to combine to produce the additive primary colors. The resulting color printing system would be able to produce pixels of black and white and five of the six primary colors, with pixel next to pixel printing producing all but the strongest saturation of the sixth primary color, an additive primary color. The color printing system uses either four color toners or a black toner and three color toners.

U.S. Pat. No. 5,534,990 entitled "Full Color Printing System Using A Penta-Level Xerographic Unit" granted on Jul. 9, 1996 to Ellis D. Harris discloses a single pass full color printing system consisting generally of a raster output scanner (ROS) optical system and a quad-level xerographic unit and a penta-level xerographic unit in tandem. This full color printing system produces pixels of black and white and all six primary colors without toner upon toner.

U.S. Pat. No. 5,337,136 entitled "Tandem Trilevel Process Color Printer" granted to John F. Knapp et al on Aug. 9, 1994 discloses a tandem tri-level architecture. Three tri-level engines are arranged in a tandem configuration. Each engine uses one of the three primary colors plus one other color. Spot by spot, two color tri-level images can be created by each of the engines. The spot by spot images are transferred to an intermediate belt member, either in a spot on spot manner for forming full color images or in a spot next to spot manner to form highlight and/or logo color images. The images created by the tri-level engines can also be transferred to the intermediate in a manner such that both spot next to spot and spot on spot transfer is effected.

U.S. Pat. No. 5,347,303 entitled "Full Color Xerographic Printing System With Dual Wavelength, Single Optical System ROS And Dual Layer Photoreceptor" granted on Sep. 13, 1994 to Kovacs et al discloses a full color xerographic printing system, either two pass or single pass, with a single polygon, single optical system ROS system which has a dual wavelength laser diode source for the ROS which images the dual beams at a single station as closely spaced spots or at two stations as closely spaced spots on a dual layer photoreceptor with each photoreceptor layer sensitive to or accessible by only one of the two wavelengths.

U.S. Pat. No. 5,373,313 entitled "Color Xerographic Printing System With Multiple Wavelength, Single Optical System ROS and Multiple Layer Photoreceptor" granted to Gregory J. Kovacs on Dec. 13, 1994 discloses single pass color xerographic printing system with a single polygon, a single optical system Raster Output Scanning (ROS) system which has a multiple wavelength laser diode source for the ROS which images the multiple beams at a single station as closely spaced spots on a multiple layer photoreceptor with each photoreceptor layer sensitive to or accessible to only one of the multiple wavelengths.

U.S. Pat. No. 5,444,463 entitled "Color Xerographic Printing System With Dual Wavelength, Single Optical System ROS And Dual Layer Photoreceptor" granted to Kovacs et al on Aug. 22, 1995 discloses a single pass color xerographic printing system with a single polygon, single optical system Raster Output Scanning (ROS) system which has a dual wavelength laser diode source for the ROS which images the dual beams at a single station as closely spaced spots on a dual layer photoreceptor with each photoreceptor layer sensitive to or accessible by only one of the two wavelengths.

U.S. Pat. No. 5,565,974 entitled "Penta-Level Xerographic Unit" granted to Ellis D. Harris on Oct. 15, 1996 discloses a penta-level xerographic unit which produces five exposure levels on a photoreceptor. The five exposure levels select between a subtractive and an adjacent additive primary color in both the CAD and DAD operational regimes of a xerographic process. Exposure levels intermediate between the CAD and the DAD result in white. The selection of two possible colors in CAD, or two possible colors in DAD, or the selection of no toner yields a possibility of five colors. This penta-level xerographic unit can be used for a K+3 reduced color gamut printer, typically cyan, yellow and red plus black.

U.S. Pat. No. 5,592,281 entitled "Development Scheme For Three Color Highlight Color Trilevel Xerography" granted to Parker et al on Jan. 7, 1997 discloses the creation of multiple color images in a single pass utilizing a multi-layered photoreceptor structure having layers which are responsive to different wavelength lasers. A composite image including three images areas is formed with substantially perfect registration. A CAD and DAD image are developed using CMB (conductive magnetic brush) development and a second DAD image is developed using a non-interactive development system. Development of the second DAD image without developing halos around the CAD image is accomplished by uniformly recharging the photoreceptor to the background potential prior to development of the second DAD image.

BRIEF DESCRIPTION OF THE INVENTION

In accordance with the present invention, a process for producing eight distinct colors, (viz. K, C, M, Y, CM, CY, MY and W) in a single pass with a single exposure in a $3\lambda/3L$ system is provided.

A $3\lambda/3L$ system has a total of eight discharge states. Full gamut process color requires K+6 colors+W and therefore in principle the eight discharge states of a $3\lambda/3L$ system are sufficient to achieve process color. However, if one is restricted to the use of four developer housings the eight distinct discharge states cannot be maintained distinct while driving the development process. The necessary flood exposure steps driving the development process will cause initially distinct discharge states to become degenerate resulting in exactly identical internal charges, fields and voltages. Once this happens the degeneracy between these two states cannot be lifted. The two states will thenceforth develop identically through the rest of the process steps and produce the same color at the end of the process. Some of the starting eight distinct discharge states therefore become degenerate and develop out to the same color so that the ability to produce the desired eight distinct colors (K, C, M, Y, CM, CY, MY and W) is lost.

According to the present invention, the use of a xerocolography with fifth developer housing containing the same color toner as one of the four normally used developer housings and suitable flood exposure devices allows the limitations described above with respect to the prior art K+6 systems to be overcome in a 3λ/3L system.

DETAILED DESCRIPTION OF THE PREFERRED EMBODIMENT OF THE INVENTION

Figure 1:
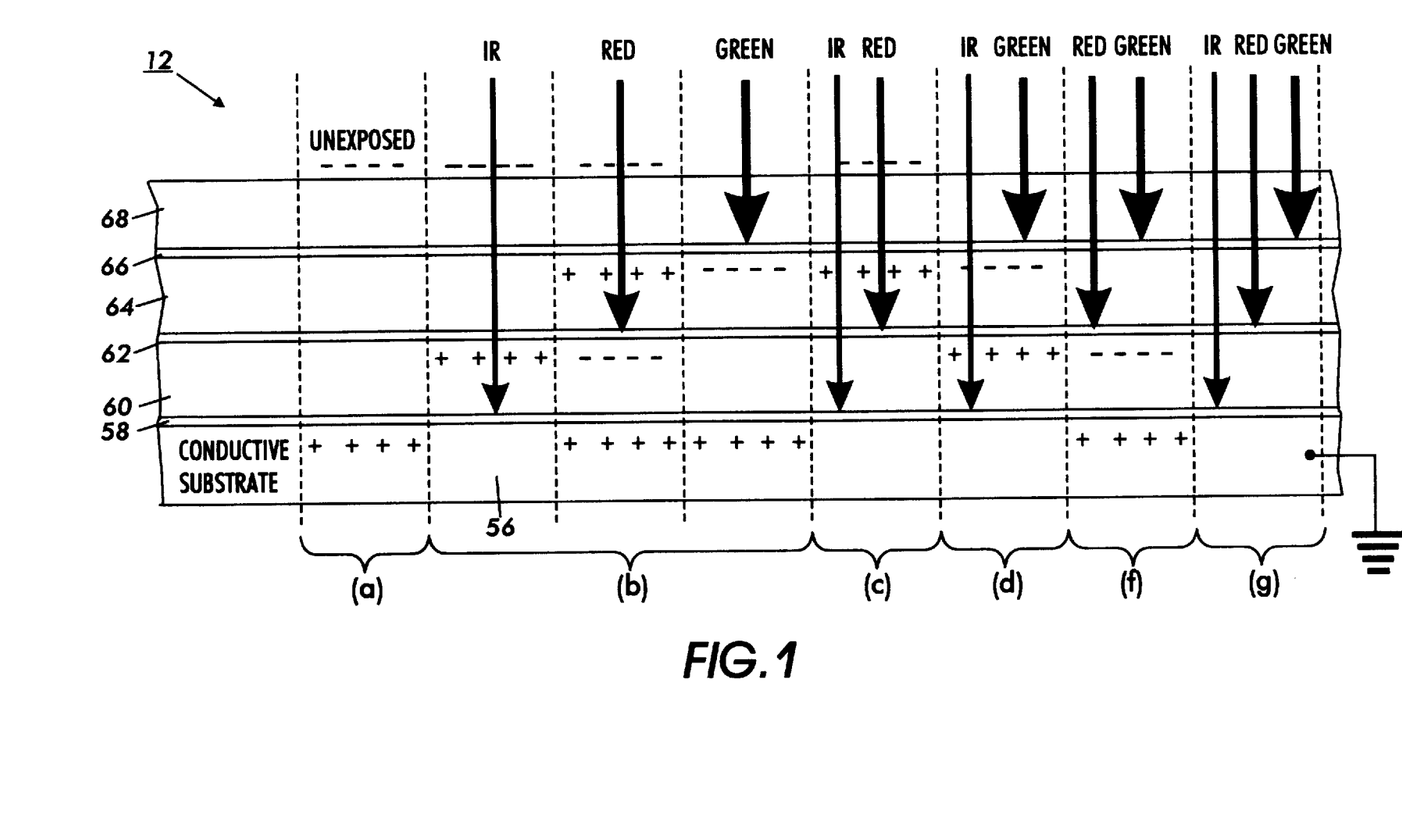
FIG. 1 is a plan view of three layer photoreceptor illustrating the exposure combinations using a three wavelength imager.
Figure 4:
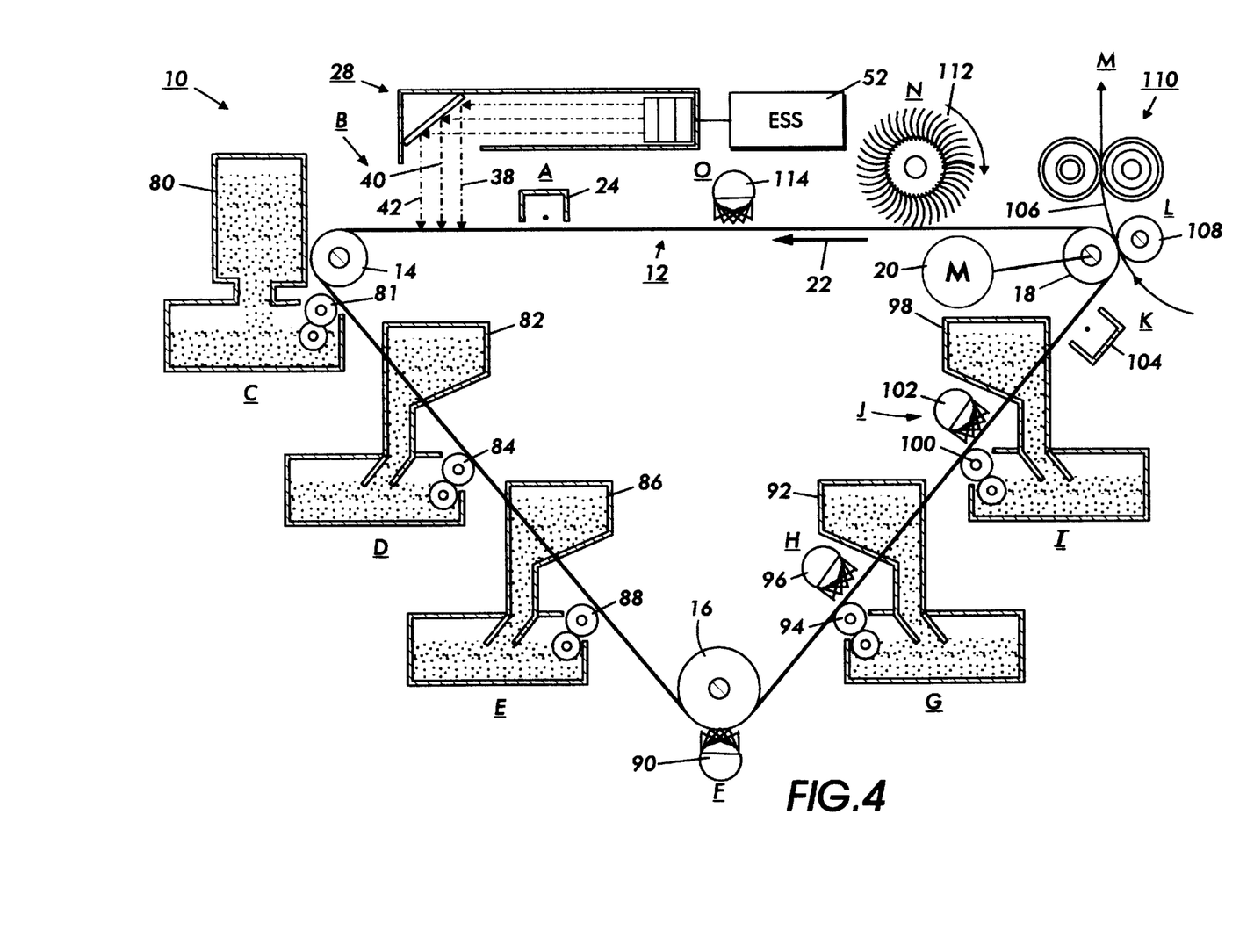
FIG. 4 is a schematic illustration of a system architecture for a three wavelength/three layer photoreceptor single pass, single exposure image processor.

In FIG. 4 there is illustrated a single pass, single exposure xerographic printing system 10 representing a preferred embodiment of the invention. The printing system 10 utilizes a charge retentive member in the form of a photoconductive belt structure 12 comprising three photoconductive layers and an electrically conductive substrate (FIG. 1). The belt structure 12 is mounted for sequential movement past a charging station A, an exposure station B, a first development station C, a second development station D, a third development station E, a first flood lamp F, a fourth development station G, a second flood exposure station H, a fifth development station I, a pre-transfer white light illumination station J, a pre-transfer charging station K, a transfer station L, a fusing station M, a cleaning station N and an erasure/exposure station O. The belt structure moves in the direction of arrow 22 to advance successive portions of the belt sequentially through the various processing stations positioned about the path of movement thereof for forming images in a single passage of the belt through the aforementioned process stations, A through O.

The belt 12 structure is entrained about a plurality of rollers 14, 16 and 18, the latter of which is used as a drive roller and the others of which can be used to provide suitable tensioning of the photoreceptor belt 12. A motor 20 rotates the drive roller 18 to advance the belt 12 in the direction of arrow 22. The drive roller is operatively coupled to the motor by suitable means.

Initially successive portions of belt structure 12 pass through charging station A, where a corona discharge device such as a scorotron or dicorotron, indicated generally by the reference numeral 24, charges the belt structure 12 to a selectively high uniform positive or negative potential, $V_0$ of approximately −1200 volts. Any suitable control circuit, well known in the art, may be employed for controlling the corona discharge device 24 to attain the desired charge level.

Next, the charged portions of the photoreceptor surface are advanced through exposure station B. At exposure station B, the uniformly charged photoreceptor or charge retentive surface 12 is exposed to a three wavelength Raster Output Scanner (ROS) device 26 to form a quad-level image. The quad-level image is one containing fully charged areas, fully discharged areas and two areas which have been discharged to two different voltage levels intermediate the fully charged areas and fully discharged areas. One of the two different voltage levels comprises a background level while the other comprises an image area.

An Electronic SubSystem (ESS) 36 converts image information into appropriate control signals for the ROS output in an imagewise fashion. The ROS operates in a full on state to emit three beams 38 (green light), 40 (red light) and 42 (IR light) of different wavelengths. In the absence of an image signal, the ROS operates in a full off state whereby none of the beams is emitted therefrom. The three different wavelength beams, 38, 40 and 42 must be scanned sequentially over top of each other on the photoreceptor to yield excellent registration. When the three beams have impinged on the same area of the photoreceptor this area is fully discharged. Areas of the photoreceptor which have not been exposed by any of the three beams remain fully charged. Impinging of any two beams in the same area of the photoreceptor results in a discharged image area at a first voltage level above the fully discharged voltage level. Impinging of any one beam on a given area of the photoreceptor results in a discharged image area at a second voltage level, higher than the first voltage level, above the fully discharged voltage level. The voltage profile of the belt structure 12 after initial exposure to the three level ROS is designated by reference character 43 in FIG. 3.

Figure 3:
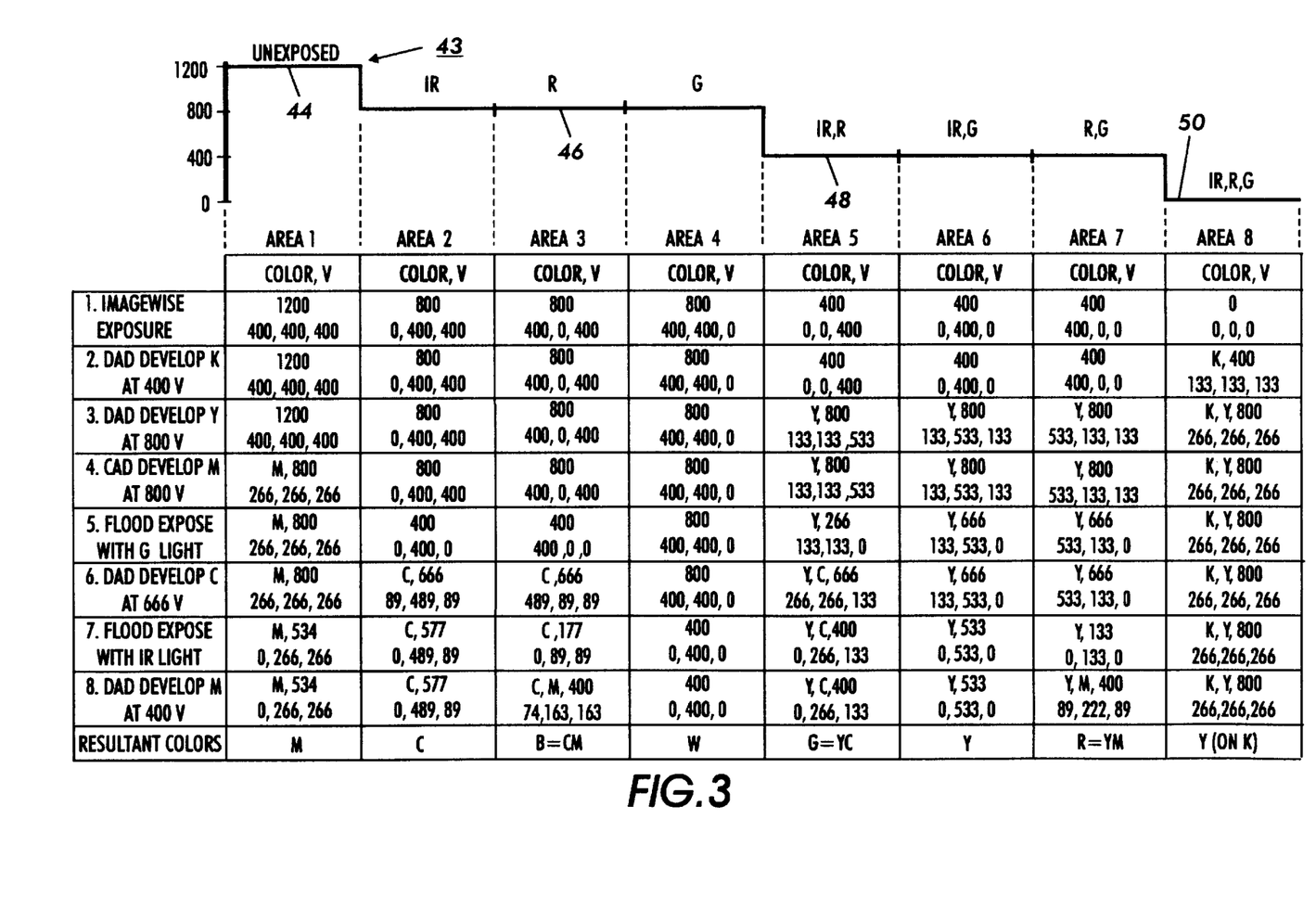
FIG. 3 illustrates the process steps for the development of full color images in a single pass with a single imager using a three wavelengths and a three layer photoreceptor.

A CAD image, 44, (FIG. 3) resulting from the full off state of the ROS is developed using Charged Area Development in step 4 of FIG. 3. DAD images in areas 46, 48 and 50 (FIG. 3) result from the exposure of the photoreceptor with one, two or all three beams of the ROS imager respectively. These DAD images are developed using Discharged Area Development in steps 2, 3, 6 and 8 of FIG. 3. A white area results in area 4 after the development process in FIG. 3 where area 4 was initially exposed with the green beam only of the ROS imager. Exposure in area 4 with the green beam only resulted initially in discharge to the second voltage level above the fully discharged voltage level.

Image data acquisition, data storage, and computations under the control of the Electronic SubSystem (ESS) 52, in FIG. 4, are well within the capabilities of present and future microprocessor-based machine controllers and do not represent part of the invention. The ESS is shown for sake of clarity as being operatively connected to the ROS 28 but as will be appreciated it is also operatively connected to other systems of the imaging apparatus 10.

Figure 2:
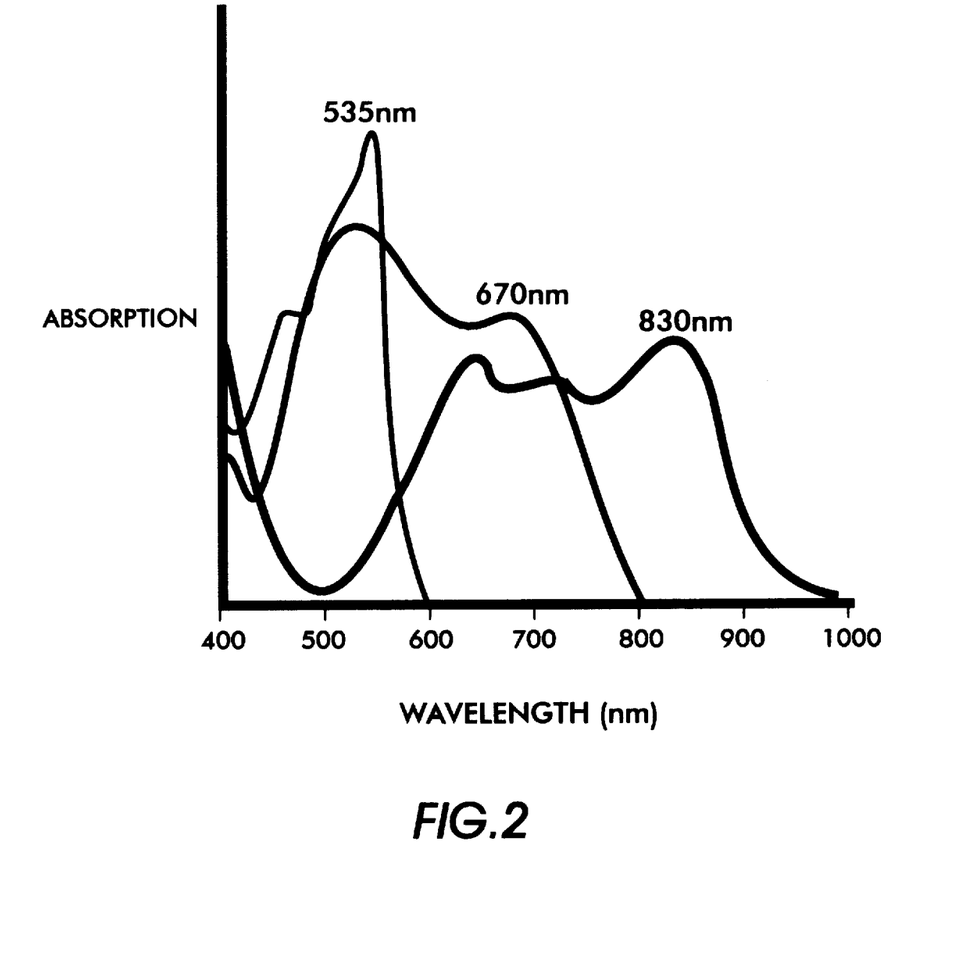
FIG. 2 is a plot of photoreceptor absorption characteristics at the three wavelengths employed by a three wavelength imager.

The photoreceptor belt structure 12 illustrated in FIG. 1 comprises a multi layer structure including an IR sensitive (e.g. 830 nm), charge generating layer 58 of e.g. GaOHPc (hydroxy gallium phthalocyanine) adhered to a conductive substrate 56. Adhered to the top of the layer 58 is its charge transport layer 60. A red sensitive (e.g. 670 nm,) charge generating layer 62 of e.g. BZP (benzimidazole perylene) is positioned on top of the transport layer 58 and has its transport layer 64 adhered to its top surface. A green sensitive (e.g. 535 nm) charge generation layer 66 of e.g. DBA (dibromoanthranthrone) and its transport layer 68 are, in turn, supported on top of the transport layer 64. DBA absorbs strongly in the green with maximum sensitivity at 535 nm. It absorbs all of the green light from the imager and does not allow any through to the red or IR sensitive layers below. However, it has essentially zero absorption at 670 nm and 830 nm. It allows both of these wavelengths to pass to the layers below and is not discharged at all by either of these wavelengths. Similarly the BZP layer absorbs the 670 nm beam completely and does not allow it to discharge the IR sensitive layer below. BZP also passes the 830 nm beam completely and is not at all discharged by it. Therefore, the 535 nm beam discharges only the DBA layer, the 670 nm beam discharges only the BZP layer and the 830 nm beam discharges only the GaOHPc layer. The photoreceptor absorption characteristics of the three photoreceptor layers as a function of wavelength are illustrated in FIG. 2.

The absence of impinging light beams in section (a) of FIG. 1 illustrates the condition of the photoreceptor following initial charging which is its fully charged state which is taken to be a typical value of about 1200 volts. In other words, the original charge voltage minus dark decay remains across the photoreceptor layers.

Section (b) shows the states of the photoreceptor when the beams 38, 40 and 42 are energized in discrete areas of the photoreceptor. In this situation, the voltage across each of the discrete areas is reduced to about 800 volts.

Section (c) shows the state of an area of the photoreceptor when the beams 42 and 40 impinge thereon. In this case, the voltage across the photoreceptor in that area is equal to about 400 volts. This is because the two beams 42 and 40 totally discharge the voltages across their respective layers leaving only the voltage across the green sensitive layer.

Section (d) shows the state of an area of the photoreceptor when the beams 42 and 38 impinge thereon while section (f) shows the state of an area of the photoreceptor when the beams 40 and 38 impinge thereon. The results here are similar to those illustrated in section (c), in that, the remaining voltage is across only one of the photoreceptor layers.

Section (g) shows the state of the photoreceptor when all three beams 38, 40 and 42 strike in the same area of the photoreceptor. This results in discharge of the voltage across all of the layers of the photoreceptor which yields the residual photoreceptor voltage expressed herein as 0 volts for sake of clarity.

The conductive substrate 56 can be opaque, translucent, semi-transparent, or transparent, and can be of any suitable conductive material, including copper, brass, nickel, zinc, chromium, stainless steel, conductive plastics and rubbers, aluminum, semitransparent aluminum, steel, cadmium, silver, gold, paper rendered conductive by the inclusion of a suitable material therein or through conditioning in a humid atmosphere to ensure the presence of sufficient water content to render the material conductive, indium, tin, metal oxides, including tin oxide and indium tin oxide, and the like. In addition, the substrate can comprise an insulative layer with a conductive coating, such as vacuum-deposited metalization on plastic, such as titanized or aluminized Mylar™ polyester, wherein the metalized surface is in contact with the bottom photoreceptor layer or any other layer such as a charge injection blocking or adhesive layer situated between the substrate and the bottom photoreceptor layer. The substrate has any effective thickness, typically from about 6 to about 250 microns, and preferably from about 50 to about 200 microns, although the thickness can be outside of this range.

The ROS 28 uses a three wavelength hybrid or monolithically integrated laser semiconductor structure consisting of a red, e.g. 670 nm, infrared, e.g. 830 nm, and a green, e.g. 535 nm wavelength emitter. Other semiconductor structures such as Light Emitting Diodes (LED) may also be employed.

The different wavelength beams 38, 40 and 42 may be tangentially offset and are scanned sequentially over top of each other on the photoreceptor on the same scan to yield excellent registration. The beams may also be sagittally offset and scanned sequentially over top of each other on different scans. The tangential offset of each laser emitter is generally given an upper limit of 300 μm since tangential offset does not introduce scan line bow up to that limit. The effect of tangential offset is to require delay in the electronic modulation signals to one of the dual beams relative to the other since one beam lags the other during scanning across the photoreceptor. One or more beams can be emitted at each wavelength.

The three laser beams 38, 40 and 42 emitted from the laser structure are input to a conventional beam input optical system which collimates, conditions and focuses the beams along appropriate optical paths such that they impinge on a rotating polygon mirror having a plurality of facets. As the polygon mirror rotates, the facets cause the reflected beams to deflect repeatedly across the scanning optics of the ROS. The deflected laser beams are input to a single set of imaging and correction optics, which corrects for errors such as polygon angle error and wobble and focuses the beams onto the photoreceptor belt structure 12.

The process steps for carrying out the invention are listed in the left hand column of the table shown in FIG. 3. The starting photoreceptor discharge states after the initial exposure are shown in the top row of the table in FIG. 3. The individual cells in the table of FIG. 3 have two lines of information. The top line shows the developed color and surface voltage after each of the process steps. The second line shows the voltage across each of layers 58, 60, 62, 64 66, and 68 of the photoreceptor respectively after each of the process steps.

The steps of the imaging process will now be described in connection with FIG. 3. For purposes of illustration, all voltage values are assumed to be both negative and ideal values. For example the voltage levels do not reflect losses due to photoreceptor dark decay nor to the residual voltage phenomenon inherent in discharged photoreceptors. Likewise, the bias voltages do not take into consideration the offset from the background voltage level necessary to establish the cleaning fields required. Also, while not shown or described, image recharging may be necessary to avoid fringe field development around already developed images passing through a downstream developer housing.

Step 1

Imagewise Exposure

The resultant voltage distributions after the initial exposures are straightforward as represented by voltage profile 43, FIG. 3. The ideal case of 100% discharge in each of the exposed layers of the photoreceptor is assumed. As will be appreciated, no image development has taken place at this point. The profile is divided into discrete areas representing all eight of the possible discharge states of the photoreceptor in response to the impingement of the three beams 38, 40 and 42 on the photoreceptor. The discrete areas are labeled Area 1, Area 2, etc. as shown at the top of each column of data in the table of FIG. 3.

Step 2

Discharged Area Development (DAD) Develop Black (K) at 400V

Subsequent to development of Area 8, the voltage in this Area changes. Areas 1–7 maintain the same voltage distribution immediately following step 1. Here negative K toner provided by developer structure 80 is developed out to raise the voltage from 0V to 400V. In all process steps the development is assumed to go to completion so toner continues to develop out until the voltage in the developed area reaches that of the developer housing bias. Conductive Magnetic Brush (CMB) development, for example, behaves very close to this ideal case. It is assumed that the developed toner layer acts like a charge sheet on the photoreceptor surface so that it applies a uniform voltage of ~133V across each of the photoreceptor layers below it. Development structure 80 may comprise a conventional magnetic brush developer arrangement or as shown a Non Interactive Development (NID) structure including an electroded donor roll 81.

Step 3

DAD Develop Yellow (Y) at 800V

All four areas, Areas 5, 6, 7, 8, that are at 400V develop out 400V of negative yellow toner to raise these areas to 800V. For this purpose, there is provided a NID structure 82 comprising an electroded donor roll structure 84. Again the toner layer is assumed to act like a charge sheet on the photoreceptor surface so that it applies a uniform voltage of ~133V across each of the photoreceptor layers below it. Yellow toner has been deposited in three clear areas, one will remain uncovered yellow; one will be subsequently covered by cyan; the other one will be subsequently covered by magenta. Some yellow toner will be deposited on the black image but it does not affect that image because after transfer the yellow toner will be completely covered by the black toner.

Step 4

Charged Area Development (CAD) Develop Magenta (M) at 800V

The initially unexposed Area 1 at 1200V will develop out 400V of positive M toner to lower this area to 800V. A CAD development housing 86 is in the form of a NID structure and also includes an electroded donor roll structure 88. The toner layer is assumed to act like a positive charge sheet on the photoreceptor surface so that it applies a uniform voltage of ~133V across each of the photoreceptor layers below it. This lowers the voltage from 400V to ~266V across each of the photoreceptor layers.

Step 5

Flood Expose with Green Light

The green light from a flood exposure lamp 90 will be blocked by the magenta toner in Area 1 and by the K toner in Area 8. However, it will penetrate Areas 5, 6, 7 which are covered with Y toner only and also Areas 2, 3, 4 which are not covered by any toner layer. In those areas where the green light penetrates, the voltage across the green sensitive photoreceptor layer will drop from the value after step 4 to zero volts. The surface voltage on the photoreceptor will therefore drop by the same amount.

Step 6

DAD Develop Cyan (C) at 666V

Two undeveloped regions, Areas 2 and 3, and one Y region, Area 5, are below 666V and these areas will all develop out negative cyan toner to raise the surface voltages in these areas to 666V. In the ideal case which we are considering, the clear Areas 2, 3 will each develop out 266V of cyan toner and the yellow covered Area 5 will develop out 400V of cyan toner. The toner layers are assumed to act like negative charge sheets at the photoreceptor surface. The toner layers therefore apply a uniform ~89V across each of the photoreceptor layers in the clear Areas 2, 3 and a uniform ~133V across each of the photoreceptor layers in the initially yellow covered Area 5. One of the areas covered with cyan only will remain a cyan only area and the other cyan covered area will be subsequently covered by magenta. The YC area will not be covered by subsequent toner layers. In the ideal case considered here the ~266V in Areas 2, 3 will develop out a smaller cyan toner mass than the 400V in Area 5. However, it is known from work with image on image (IOI) systems that under identical development voltage, development of a given color onto a bare photoreceptor is more efficient than development of the same color toner onto an already developed second color toner layer. Therefore the larger development voltage available in the already yellow toner covered areas relative to the undeveloped Areas 2,3 (400V vs ~266V) should help to equalize the total developed cyan toner mass in all three Areas 2, 3, 5. The cyan toner is deposited using a NID structure 92 including an electroded donor roll structure 94.

Step 7

Flood Expose with Infrared (IR) Light

If the IR light from flood exposure lamp 96 came from the front side of the photoreceptor it will be blocked by the K toner in Area 8 but will penetrate all other areas. In each of the areas where the IR light penetrates through the photoreceptor the voltage across the IR sensitive photoreceptor layer will drop from the value after step 6 to zero volts. The surface voltage on the photoreceptor in any given area will drop by the same amount. The IR light from the flood exposure lamp 96 could also come from the back side of the photoreceptor as shown in FIG. 4. The subsequent process steps would be the same as discussed below in Feature (9).

Step 8

DAD Develop Magenta (M) at 400V

After Step 7 there are two areas below 400V, viz. Area 3 covered with cyan toner at 177V and Area 7 covered with yellow toner at 133V. These two areas develop out negative magenta toner to 400V using a NID structure 98 including an electroded donor roll 100. Area 3 has 223V of development potential and Area 7 has 267V of development potential. Since the development potentials are similar and since both areas already have one existing toner layer, both areas should develop out roughly equal amounts of magenta toner. The magenta toner developed in Area 1 at Step 4 was a positive magenta toner seeing 400V of development potential, whereas the magenta toner developed in Areas 3 and 7 is a negative magenta toner seeing ~250V of development potential. The charge/mass ratios, Q/M's of the positive and negative magenta toners can be adjusted independently so that equal amounts/densities of toners develop out in the two cases. It will be appreciated that each of the electroded donor roll structures may be replaced with a multi-wire toner cloud development system known in the prior art wherein AC voltage is applied to the wires for liberating the toner so that it can be attracted to the image on the photoreceptor. In a multi-wire system, the wires are positioned in the development gap between a donor roll and the imaging surface, for example, the photoreceptor belt structure 12.

The resultant colors are shown in the bottom row of the table of FIG. 3. All discharge states have been developed to give a unique color so that full process color consisting of K, C, M, Y, CM, CY, MC and W is achieved.

Several features of FIG. 3 are worth noting.

(1) Area 8 develops K toner on top of the photoreceptor and the yellow toner on top of the K toner. When transferred to paper the K toner will end up on top masking the yellow toner below. Therefore Area 8 will appear black as it should and as indicated in the bottom row of the table of FIG. 3. The yellow toner underneath will add additional blue absorption to the blue absorption already imparted by the black toner.

(2) Since the CAD M development in Step 4 develops a different area than Steps 2 or 3 it could come before Step 2 or between Steps 2 and 3.

(3) As already mentioned in the description of Step 6 above the cyan toner has a larger development potential in Area 5 where it develops on top of yellow than in Areas 2 and 3 where it develops on the bare photoreceptor. For the same development potential more toner mass tends to develop out on the bare photoreceptor than on an already developed toner layer due to the increased capacitance of the bare photoreceptor. Therefore the larger development potential in Area 5 can be used to advantage to help equalize the cyan toner mass developed in the bare Areas 2 and 3 and yellow toner covered Area 5 regions.

(4) As already mentioned in the description of Step 8 the positive CAD M toner developed in Step 4 sees a larger development potential than the negative DAD M toner developed in Step 8. The Q/M's of the positive and negative magenta toners can be adjusted independently so that equal amounts/densities of toners develop out in the two cases.

(5) Yellow is arbitrarily chosen as the first DAD development color in Step 3 of FIG. 3. However, the yellow and cyan toners in Steps 3 and 6 could be interchanged. This is because both cyan and yellow behave identically under flood exposure with green light in Step 5 and under flood exposure with IR light in Step 7, i.e., both are transparent to green and to IR. The same resultant colors would be produced in the bottom row of the table of FIG. 3 although in different areas. In addition, on transfer to paper the black toner in Area 8 would end up on top of C toner instead of on top of Y toner.

(6) All toners are negative DAD toners except for the positive CAD magenta toner used in Step 4.

(7) Magenta is arbitrarily chosen as the toner to be developed twice, once in a CAD and once in a DAD process. Cyan toner could be used in place of magenta in Steps 4 and 8 but then a red flood exposure would need to be used in place of the green flood exposure in Step 5. The yellow toner developed in Step 3 will pass the red flood light identically to the way it passes the green flood light in Step 5. The CAD developed toner in Step 4 must block the flood exposure light used in Step 5 to prevent the surface voltage in Area 1 from dropping below the development bias used in Step 6. If cyan toner is used in place of magenta in Steps 4 and 8 then magenta toner would be used in place of cyan in Step 6. The same resultant colors would be produced on the bottom row of the table of FIG. 3 only again in a different order.

Magenta could equally well be interchanged with yellow but then a blue flood exposure must be used in Step 5. This also implies that the top layer 3 of the photoreceptor be sensitive to blue light and completely absorb it so that it does not induce discharge in the lower layers.

(8) A blue semiconductor laser may be used in lieu of the green laser in which case the green sensitive layer 3 would be replaced with a blue sensitive layer. If the blue sensitive photoreceptor is not also sensitive to green light the magenta toner development and green light flood exposure must be exchanged. The exchange could be with cyan toner and red light flood exposure or with yellow toner and blue light flood exposure.

(9) IR flood exposure could be done from the back side of the photoreceptor to conserve space on the front side. The effect of back side exposure is identical to front side exposure in all of Areas 1–7. The only difference is in Area 8 where back side IR exposure discharges the bottom Layer 3 of the photoreceptor in Area 8 whereas with top side exposure the black toner in Area 8 blocks this exposure. Back side exposure drops the surface voltage on the photoreceptor by ~266V from 800V to 534V. This voltage drop has no effect on the last process Step 8 where a DAD development of magenta is done at 400V. The 534V in Area 8 is still well above the development bias of 400V in Step 8. Therefore no toner should develop in Area 8 during Step 8.

A system architecture which can be used to implement the invention described herein is shown in FIG. 4. Most components should be obvious from the process steps described in FIG. 3. The IR flood lamp is placed on the back side of three layer photoreceptor belt as discussed in Feature (9) above. The steps not described in FIG. 3 above are the following:

Step 9

Pretransfer Back Side Exposure

This back side white light exposure lo using lamp 102 eliminates the fields across the photoreceptor an therefore reduces the surface voltage to zero. Under this condition areas of positive toner are neutralized by residual negative surface corona and areas of negative toner are neutralized by positive surface holes. This reduction to zero surface voltage is necessary to allow the effective and efficient operation of the pretransfer corotron in the next step.

Step 10

Pretransfer Corotron Charging

This step deposits negative charge only, onto the toner and photoreceptor surface and raises the voltage to a uniform value. The forgoing is accomplished using a corona discharge device 104. The deposited negative toner will generally become more negative and the deposited positive toner will flip sign and become negative under the negative corona deposited by the pretransfer corotron. With all of the toner on the photoreceptor surface now negatively charged, uniform transfer of the toner to paper becomes possible in the next step.

Step 11

Transfer to Paper

Since the toner on the photoreceptor is all negatively charged from the previous step, transfer to paper substrate 106 is done by positive corona charging on the back side of the paper or by a positively biased transfer roll 108.

Step 12

Fusing

The transferred image is fused to the paper using a heat and pressure color fuser generally indicated by reference character 110.

Step 13

Cleaning

A magnetic brush 112 cleaner or alternatively a blade removes untransferred toner from the photoreceptor surface.

Step 14

White Light Erase

An erase lamp 114 removes any residual fields from the interior of the photoreceptor.

Step 15

Corotron Charging

Negative corona charge using the corona discharge device 24 is deposited on the photoreceptor surface in preparation for the next imaging and development cycle.

I claim:

1. A method of creating color images in a single pass using a single exposure device capable of emitting beams at three different wavelengths and a three layer electrophotographic element, responsive to the three different wavelength beams, said method including the steps of:

uniformly charging said charge retentive structure to a predetermined voltage level;

using a single exposure device operating at three different wavelengths, creating latent electrostatic images comprising images at four different voltage levels;

developing said images with CAD and DAD development with three different color inks;

flood exposing with light of a predetermined wavelength developed image areas as well as undeveloped image areas to form DAD images developable with a fourth color ink distinct from said three different color inks;

developing said DAD images developable with a fourth color ink and said an already developed image thereby forming images of two different colors which are different from said three different color inks;

flood exposing with light of a predetermined wavelength other already developed images to form other DAD image areas;

developing said other DAD image areas with an ink of the same color as one of said three different color inks.

2. The method according to claim 1 wherein said step of conditioning developed image areas as well as undeveloped image areas is effected using a flood illumination source having a first predetermined wavelength.

3. The method according to claim 2 wherein said step of conditioning other already developed images is effected using a flood illumination source of a second predetermined wavelength.

4. The method according to claim 3 wherein said three different color inks are black, yellow and magenta and said flood illumination having a first predetermined wavelength comprises a green light source.

5. The method according to claim 4 wherein said flood illumination source having a second predetermined wavelength comprises an infrared light source.

6. The method according to claim 5 wherein said ink of the same color as one of said three different color inks is magenta.

7. The method according to claim 6 wherein said charge retentive structure comprises a photoreceptor belt.

8. The method according to claim 7 wherein all of said color inks comprise toners.

9. The method according to claim 3 wherein said three different color inks are black, yellow and cyan and said flood illumination having a first predetermined wavelength comprises a red flood illumination source.

10. The method according to claim 9 wherein said ink of the same color as one of said three different color inks is cyan.

11. The method according to claim 10 wherein said charge retentive structure comprises a photoreceptor belt.

12. The method according to claim 11 wherein all of said color inks comprise toners.

13. The method according to claim 6 wherein said exposure device comprises a ROS.

14. The method according to claim 6 wherein said exposure source comprises LEDs.

15. A method of creating color images in a single pass using a single exposure device capable of emitting beams at three different wavelengths and a three layer electrophotographic element, responsive to three different wavelength beams, said method including the steps of:

uniformly charging said charge retentive structure to a predetermined voltage level;

using a single exposure device operating at three different wavelengths, creating latent electrostatic images comprising images at four different voltage levels;

developing said images with CAD and DAD development with different color inks;

flood exposing with light of a predetermined wavelength developed image areas as well as undeveloped image areas to form DAD images developable with another color ink distinct from said different color inks;

developing said DAD images developable with another color ink and said an already developed image thereby forming images of two different colors different from said different color inks used for developing said DAD and CAD images;

flood exposing with light of a predetermined wavelength other already developed images to form other DAD image areas;

developing said other DAD image areas with an ink of the same color as one of said different color inks used for developing said DAD and CAD images.

16. The method according to claim 15 wherein said step of conditioning developed image areas as well as undeveloped image areas is effected using a flood illumination source having a first predetermined wavelength.

17. The method according to claim 16 wherein said step of conditioning other already developed images is effected using a flood illumination source of a second predetermined wavelength.

18. The method according to claim 17 wherein said different color inks used to develop said CAD and DAD image are yellow and magenta and said flood illumination having a first predetermined wavelength comprises a green light source.

19. The method according to claim 18 wherein said flood illumination source having a second predetermined wavelength comprises an infrared light source.

20. The method according to claim 19 wherein said ink of the same color is magenta.

\* \* \* \* \*